US011990106B2

(12) United States Patent
Pyun et al.

(10) Patent No.: US 11,990,106 B2
(45) **Date of Patent: *May 21, 2024**

(54) SCREEN SAVER CONTROLLER, DISPLAY DEVICE INCLUDING THE SCREEN SAVER CONTROLLER, AND METHOD OF DRIVING A DISPLAY DEVICE INCLUDING THE SCREEN SAVER CONTROLLER

(71) Applicant: SAMSUNG DISPLAY CO., LTD., Yongin-si (KR)

(72) Inventors: Kihyun Pyun, Gwangmyeong-si (KR); Eunjin Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,351

(22) Filed: Dec. 15, 2022

(65) Prior Publication Data

US 2023/0109819 A1 Apr. 13, 2023

Related U.S. Application Data

(63) Continuation of application No. 17/457,300, filed on Dec. 2, 2021, now Pat. No. 11,557,268.

(30) Foreign Application Priority Data

Feb. 9, 2021 (KR) ........................ 10-2021-0018163

(51) Int. Cl.
*G09G 5/10* (2006.01)

(52) U.S. Cl.
CPC ....... *G09G 5/10* (2013.01); *G09G 2310/0267* (2013.01); *G09G 2310/027* (2013.01);
(Continued)

(58) Field of Classification Search
CPC ............. G09G 5/10; G09G 2310/0267; G09G 2310/027; G09G 2310/08; G09G 2320/0257; G09G 2320/041
See application file for complete search history.

(56) References Cited

U.S. PATENT DOCUMENTS 9,524,676 B2 12/2016 Bi et al.
9,612,880 B1 4/2017 Hedley et al.
(Continued)

FOREIGN PATENT DOCUMENTS

KR 10-0189540 1/1999
KR 10-0284258 12/2000
KR 10-2019-0032807 3/2019

*Primary Examiner* — Antonio Xavier
(74) *Attorney, Agent, or Firm* — F. CHAU & ASSOCIATES, LLC

(57) ABSTRACT

A screen saver controller includes a temperature calculator, a temperature comparator, an operator, and a screen saver data generator. The temperature calculator calculates temperature data of a display panel based on input image data. The temperature comparator receives the temperature data and a target temperature and compares a temperature of the display panel with the target temperature to generate temperature change data. The operator receives the temperature data and the temperature change data and generates operation data based on the temperature data and the temperature change data. The screen saver data generator receives the operation data and generates screen saver data based on the operation data. The screen saver controller adjusts a luminance of the display panel based on the screen saver data when operating in a first mode.

9 Claims, 7 Drawing Sheets

(52) U.S. Cl.
CPC . *G09G 2310/08* (2013.01); *G09G 2320/0257* (2013.01); *G09G 2320/041* (2013.01)

(56) References Cited

U.S. PATENT DOCUMENTS

| | | | | |
|---|---|---|---|---|
| 11,335,280 | B2 | 5/2022 | Sato et al. | |
| 2005/0196124 | A1* | 9/2005 | Aldereguia | G06F 13/4265 385/147 |
| 2005/0248517 | A1* | 11/2005 | Luther Weindorf | G09G 3/3208 345/82 |
| 2007/0097502 | A1 | 5/2007 | Lipton et al. | |
| 2007/0124705 | A1 | 5/2007 | Ichimura | |
| 2007/0216671 | A1 | 9/2007 | Oku et al. | |
| 2009/0207312 | A1* | 8/2009 | Miyoshi | H04N 21/42202 348/E5.119 |
| 2010/0313172 | A1 | 12/2010 | Hirahara | |
| 2014/0253527 | A1 | 9/2014 | Ogi et al. | |
| 2014/0375704 | A1* | 12/2014 | Bi | G09G 3/3275 345/694 |
| 2016/0260413 | A1* | 9/2016 | You | G09G 5/10 |
| 2016/0351139 | A1* | 12/2016 | Syu | G09G 3/2011 |
| 2018/0286349 | A1 | 10/2018 | Mohammadi et al. | |
| 2020/0027394 | A1* | 1/2020 | Tang | G09G 3/3233 |
| 2020/0166409 | A1 | 5/2020 | Nemoto et al. | |
| 2021/0185167 | A1* | 6/2021 | Chen | G09G 3/3225 |
| 2021/0225325 | A1* | 7/2021 | Chu | G09G 3/2074 |
| 2021/0286755 | A1* | 9/2021 | Vorbach | G06F 9/345 |
| 2022/0122517 | A1* | 4/2022 | Park | G09G 3/22 |
| 2022/0157237 | A1* | 5/2022 | Tang | G09G 3/3233 |
| 2022/0254318 | A1 | 8/2022 | Pyun | |
| 2023/0087240 | A1* | 3/2023 | Fenigshtein | A61F 7/00 |

* cited by examiner

SCREEN SAVER CONTROLLER, DISPLAY DEVICE INCLUDING THE SCREEN SAVER CONTROLLER, AND METHOD OF DRIVING A DISPLAY DEVICE INCLUDING THE SCREEN SAVER CONTROLLER

CROSS-REFERENCE TO RELATED APPLICATION

This application claims priority under 35 USC § 120 to U.S. patent application Ser. No. 17/457,300, filed on Dec. 2, 2021, and under 35 USC § 119 to Korean Patent Application No. 10-2021-0018163, filed on Feb. 9, 2021, in the Korean Intellectual Property Office (KIPO), the entire disclosures of which are incorporated by reference herein.

BACKGROUND

1. Field

One or more embodiments described herein relate to a screen saver controller, a display device including a screen saver controller, and a method of driving a display device including a screen saver controller.

2. Description of the Related Art

A display device may include a display panel and a display panel driver. The display panel may include pixels which generate light to display an image based on input image data. The display panel may be connected to the display panel driver through gate lines and data lines. The display panel driver may include, for example, a gate driver that provides gate signals through the gate lines, a data driver that provides data voltages through the data lines, and a timing controller that controls the gate driver and data driver.

Some display devices operate in a screen saver mode when a predetermined condition is satisfied. When operating in screen saver mode, such a display device may output a black image to the display panel or may decrease luminance of the display panel. In some cases, a display device may operate in screen saver mode based on screen saver data without considering the temperature of the display panel. This may cause an afterimage to appear even in screen saver mode, which, in turn, may limit the lifespan of the display panel.

SUMMARY

One or more embodiments described herein provide a screen saver controller that performs a screen saver mode for a display panel using temperature data of the display panel.

One or more additional embodiments provide a screen saver controller that increases the lifespan of a display panel.

One or more additional embodiments provide a screen saver controller that improves afterimage visibleness of the display panel.

One or more additional embodiments provide a display device including a screen saver controller as described herein.

One or more additional embodiments provide a method of driving a display device including a screen saver controller as described herein.

In accordance with one or more embodiments, a screen saver controller includes a temperature calculator configured to calculate temperature data of a display panel based on input image data; a temperature comparator configured to receive the temperature data and a target temperature and compare a temperature of the display panel with the target temperature to generate temperature change data; an operator configured to receive the temperature data and the temperature change data and generate operation data based on the temperature data and the temperature change data; and a screen saver data generator configured to receive the operation data and generate screen saver data based on the operation data, wherein the screen saver controller is configured to adjust a luminance of the display panel based on the screen saver data when operating in a first mode.

In accordance with one or more embodiments, a display device includes a display panel including a plurality of pixels; a data driver configured to provide a data signal to the display panel; a gate driver configured to provide a gate signal to the display panel; a timing controller configured to control the data driver and the gate driver; and a screen saver controller configured to determine whether to operate in a first mode based on input image data and adjust a luminance of the display panel based on screen saver data when operating in the first mode.

The screen saver controller includes a temperature calculator configured to calculate temperature data of the display panel based on the input image data; a temperature comparator configured to receive the temperature data and a target temperature and compare a temperature of the display panel with the target temperature to generate temperature change data; an operator configured to receive the temperature data and the temperature change data and generate operation data based on the temperature data and the temperature change data; and a screen saver data generator configured to receive the operation data and generate screen saver data based on the operation data.

In accordance with one or more embodiments, a method of driving a display device includes determining whether to operate in a first mode based on input image data; calculating temperature data of a display panel based on the input image data; comparing a temperature of the display panel with a target temperature to generate temperature change data; generating operation data based on the temperature data and the temperature change data; generating screen saver data based on the operation data; and adjusting a luminance of the display panel based on the screen saver data.

DETAILED DESCRIPTION OF THE EMBODIMENTS

Hereinafter, embodiments of the present disclosure will be explained in detail with reference to the accompanying drawings.

Figure 1:
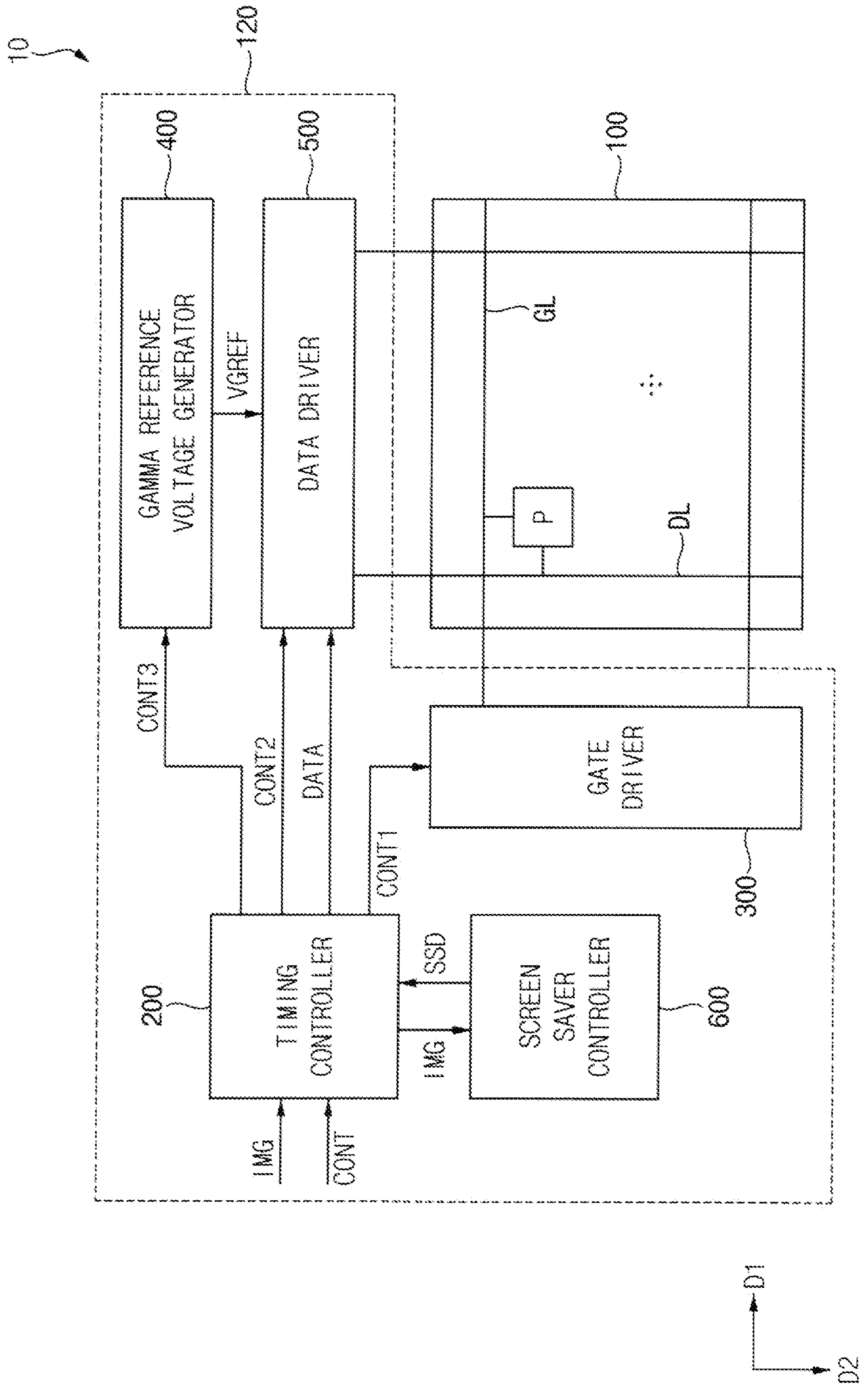
FIG. 1 illustrates an embodiment of a display device.

FIG. 1 is a block diagram showing an embodiment of a display device 10 which may include a display panel 100 and a display panel driver 120.

Referring to FIG. 1, the display panel driver 120 may include a timing controller 200, a gate driver 300, a gamma reference voltage generator 400, and a data driver 500. The display panel driver 120 may further include a screen saver controller 600.

The display panel 100 may include a display part for displaying an image and a peripheral part adjacent to the display part. The display panel 100 may include pixels P and may display an image corresponding to input image data based on light from the pixels P. Gate lines GL may extend in a first direction D1, and data lines DL may extend in a second direction D2 intersecting the first direction D1.

The display panel 100 may include a plurality of panel blocks, e.g., the display panel 100 may be divided into a plurality of panel blocks. Each of the panel blocks may include a plurality of pixels P. For example, each of the panel blocks may be a large panel block. The large panel block may include a predetermined number of pixels, e.g., 240×120 pixels P. The display device 10 may calculate temperature data TD and temperature change data TCD in a unit of a large panel block. In one embodiment, each of the panel blocks may be a small panel block. The small panel block may a predetermined number of pixels, e.g., 8×8 pixels P. The display device 10 may calculate the temperature data TD and the temperature change data TCD in a unit of a small panel block.

The timing controller 200 may receive input image data IMG and an input control signal CONT from an external device, e.g., a host. For example, the input image data IMG received from the external device may include red image data, green image data, and blue image data. In some embodiments, the input image data IMG may further include white image data. As another example, the input image data IMG may include magenta image data, yellow image data, and cyan image data. The input control signal CONT received from the external device may include, for example, a master clock signal, a data enable signal, a vertical synchronization signal, a horizontal synchronization signal or another combination of signals.

In one embodiment, the timing controller 200 may generate a first control signal CONT1, a second control signal CONT2, a third control signal CONT3, and a data signal DATA based on the input image data IMG and the input control signal CONT.

The timing controller 200 may generate and output the first control signal CONT1 to control the gate driver 300 based on the input control signal CONT. The first control signal CONT1 may include, for example, a vertical start signal and a gate clock signal.

The timing controller 200 may generate and output the second control signal CONT2 to control the data driver 500 based on the input control signal CONT. The second control signal CONT2 may include, for example, a horizontal start signal and a load signal.

The timing controller 200 may generate the data signal DATA based on the input image data IMG and output the generated data signal DATA to the data driver 500.

The timing controller 200 may generate and output the third control signal CONT3 to control the gamma reference voltage generator 400 based on the input control signal CONT.

The gate driver 300 may generate gate signals for driving the gate lines GL in response to the first control signal CONT1 received from the timing controller 200. The gate driver 300 may output the generated gate signals to the gate lines GL. For example, the gate driver 300 may sequentially output the gate signals to the gate lines GL. In some embodiments, the gate driver 300 may be mounted on the peripheral part of the display panel 100.

The gamma reference voltage generator 400 may generate a gamma reference voltage VGREF in response to the third control signal CONT3 received from the timing controller 200. The gamma reference voltage generator 400 may provide the generated gamma reference voltage VGREF to the data driver 500. The gamma reference voltage VGREF provided to the data driver 500 may have a value corresponding to each data signal DATA. In some embodiments, the gamma reference voltage generator 400 may be disposed in the timing controller 200 or in the data driver 500.

The data driver 500 may receive the second control signal CONT2 and the data signal DATA from the timing controller 200 and the gamma reference voltage VGREF from the gamma reference voltage generator 400. The data driver 500 may convert a digital data signal DATA to an analog data voltage using the gamma reference voltage VGREF. The data driver 500 may output data voltages to the data lines DL.

The screen saver controller 600 may receive the input image data IMG from the timing controller 200. The screen saver controller 600 may generate screen saver data SSD based on the input image data IMG, and may output the generated screen saver data SSD to the timing controller 200. The arrangement of the screen saver controller 600 of FIG. 1 is an example, and may be configured structurally and/or functionally in a different manner in another embodiment. In some embodiments, the screen saver controller 600 may be disposed inside the timing controller 200 so as to be a part of the timing controller 200. In other embodiments, the screen saver controller 600 may be disposed outside the timing controller 200 and interact with the timing controller 200 using data. An embodiment of the screen saver controller 600 is described with reference to FIGS. 2 to 5.

Figure 2:
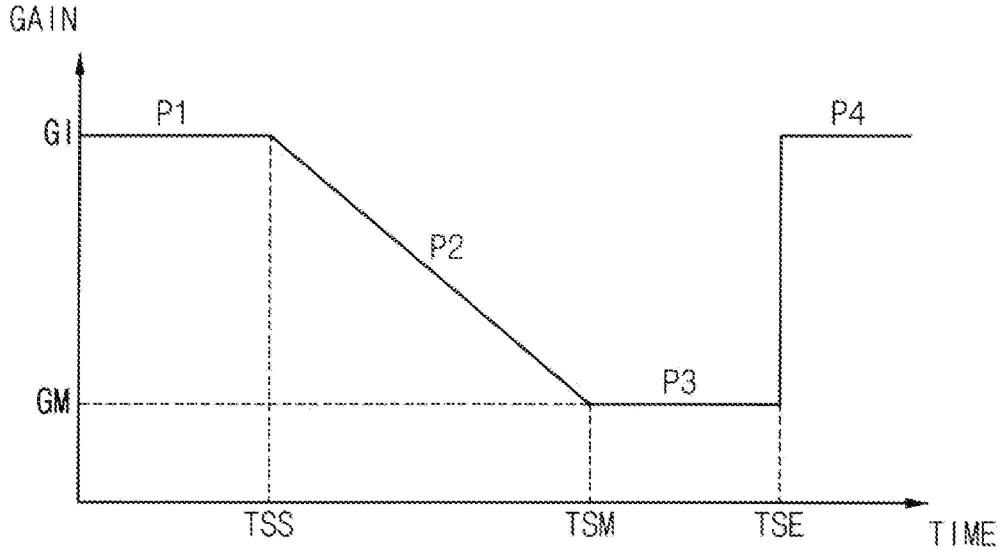
FIG. 2 illustrates an example of luminance gain variation of an image displayed on a display panel when a screen saver mode is operated.
Figure 3:
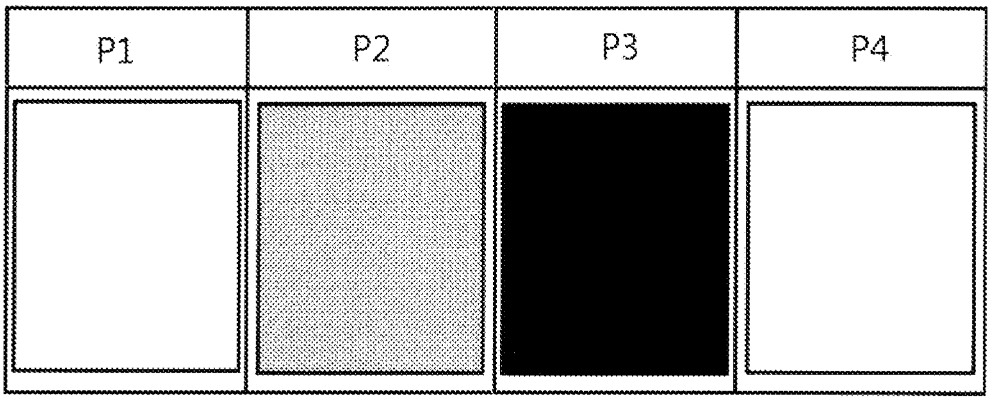
FIG. 3 illustrates an example of a luminance variation of an image displayed on a display panel for each of a plurality of periods.

FIG. 2 is a graph showing an example of luminance gain variation of an image displayed on a display panel when a screen saver mode is operated. FIG. 3 is a diagram showing an example of a luminance variation of an image displayed on a display panel for each of a plurality of periods in FIG. 2.

Referring to FIGS. 1 to 3, the display device 10 may determine whether to operate a screen saver mode based on the input image data IMG. The display device 10 may determine whether an image displayed on the display panel 100 is a still image based on the input image data IMG. When the still image displayed on the display panel 100 is maintained for a predetermined time, the screen saver controller 600 may generate the screen saver data SSD based on the input image data IMG, and may output the generated screen saver data SSD to the timing controller 200. When the screen saver mode is operated, the display device 10 may adjust a luminance of the display panel 100 based on the screen saver data SSD.

In an embodiment, the display device 10 may operate the display panel 100 at a constant luminance as in a first period before the screen saver mode is operated. For example, a luminance gain of the display panel 100 in the first period P1 may be an initial gain GI in which the screen saver mode is not operated. When the display device 10 operates in the screen saver mode, the luminance gain of the display panel 100 may be decreased to a predetermined (e.g., minimum or other) gain as in a second period. For example, the luminance gain of the display panel 100 may be gradually decreased from the initial gain to the minimum gain from a screen saver mode start time point TSS. In the second period, the luminance of the display panel 100 may be gradually decreased. The display panel 100 may maintain the predetermined (e.g., minimum or other gain) as in a third period P3 from a minimum gain reaching time point TSM that represents a time at which the luminance gain of the display panel 100 is decreased to the minimum gain. In the third period, the luminance of the display panel 100 may maintain a predetermined (e.g., minimum or other) luminance. Meanwhile, while the screen saver mode is operated, at a predetermined change occurring time point TSE, the screen saver mode may be released as in a fourth period P4, and the luminance gain of the display panel 100 may be increased to another gain, e.g., the initial gain.

As a temperature of the display panel 100 increases, a characteristic value of the display panel 100 may be changed. When the screen saver mode is operated without considering the temperature of the display panel 100, unnecessary power consumption may be caused in the display panel 100. Also, overcurrent may be introduced into each of the pixels. These effects may adversely affect (e.g., shorten) the lifespans of the display panel 100 and/or the pixels. According to one embodiment of the display device 10, the screen saver mode is operated based on the temperature data TD and the temperature change data TCD, so that a screen saver mode optimized for a temperature variation may be provided and the lifespans of the pixels and display panel may be increased or even maximized.

Figure 4:
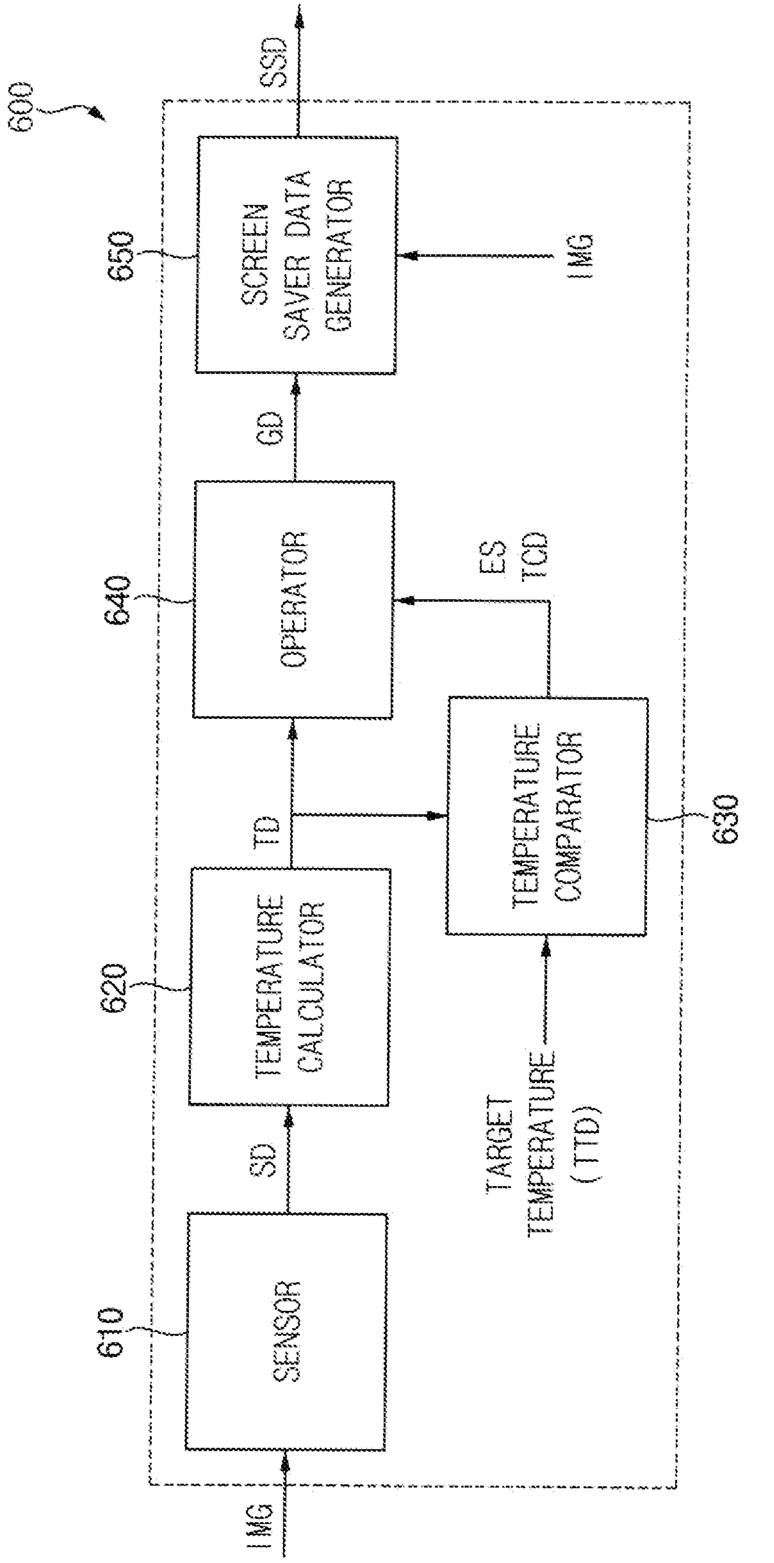
FIG. 4 illustrates an embodiment of a screen saver controller.
Figure 5:
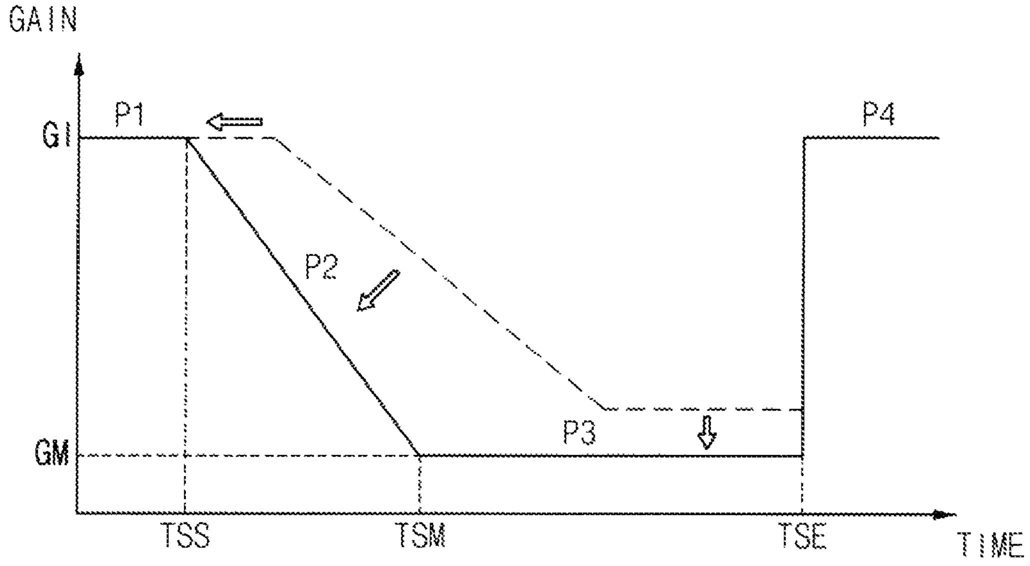
FIG. 5 illustrates an example of luminance gain variation of an image displayed on a display panel when a screen saver mode is operated by an embodiment of a screen saver controller.

FIG. 4 is a block diagram showing an embodiment of a screen saver controller, which, for example, may be included in the display device of FIG. 1. FIG. 5 is a graph showing an example of luminance gain variation of an image displayed on a display panel when a screen saver mode is operated according to an operation of the screen saver controller 600 of FIG. 4. In operation, the screen saver controller 600 may adjust the luminance of the display panel 100 based on the screen saver data SSD when the screen saver mode is operated.

Referring to FIGS. 1 to 5, in an embodiment the screen saver controller 600 may include a sensor 610, a temperature calculator 620, a temperature comparator 630, an operator 640, and a screen saver data (SSD) generator 650. The temperature calculator 620 may calculate the temperature data TD of the display panel 100 based on the input image data. The temperature comparator 630 may receive the temperature data TD and a target temperature TTD and compare the temperature of the display panel 100 with the target temperature TTD to generate the temperature change data TCD. The operator 640 may receive the temperature data TD and the temperature change data TCD and generate operation data GD based on the temperature data TD and the temperature change data TCD. The screen saver data (SSD) generator 650 may receive the operation data GD and generate the screen saver data SSD based on the operation data GD. In addition, the screen saver controller may include the sensor 610 which may sense state information of the display panel 100 based on the input image data, and may generate sensing data SD based on the state information to output the generated sensing data SD to the temperature calculator 620.

The sensor 610 may receive the input image data and sense the state information of the display panel 100 in the input image data. The state information of the display panel 100 may include at least one of load information of the display panel 100, gray level information of the display panel 100, ambient temperature information of the display panel 100, luminance information of the display panel 100, or lifespan information of the display panel 100.

For example, the load information of the display panel 100 may include information representing a load value in the input image data of the display panel 100. The gray level information of the display panel 100 may include information obtained by analyzing a maximum gray level of the display panel 100. The ambient temperature of the display panel 100 may be an ambient temperature of the display panel 100 measured by a temperature sensor. The luminance information of the display panel 100 may be peak luminance information of the image displayed on the display panel 100. The lifespan information of the display panel 100 may be lifespan information of a plurality of pixels according to the characteristic value of the display panel 100. The sensor 610 may generate sensing data SD based on the state information to output the generated sensing data SD to the temperature calculator 620.

The temperature calculator 620 may receive the sensing data SD from the sensor 610 and may calculate the temperature data TD based on the sensing data SD. For example, the temperature calculator 620 may calculate the temperature of the display panel 100 based on the state information of the display panel 100 in the sensing data SD to output the temperature data TD. In one embodiment, the temperature calculator 620 may calculate the temperature of the display panel 100 based on at least one of the load information of the display panel 100, the gray level information of the display panel 100, the ambient temperature information of the display panel 100, the luminance information of the display panel 100, or the lifespan information of the display panel 100 to output the temperature data TD. The temperature calculator 620 may transmit the temperature data TD to the temperature comparator 630. The temperature calculator 620 may transmit the temperature data TD to the operator 640.

The temperature comparator 630 may receive the temperature data TD from the temperature calculator 620. The temperature comparator 630 may receive the target temperature TTD. The target temperature TTD may be settable or predetermined. The temperature comparator 630 may receive the temperature data TD and the target temperature TTD, and may compare the temperature of the display panel 100 with the target temperature TTD to generate the temperature change data TCD. The temperature change data TCD may include information representing a difference between the temperature of the display panel 100 and the target temperature TTD. The temperature comparator 630 may transmit the temperature change data TCD to the operator 640.

The operator 640 may receive the temperature data TD from the temperature calculator 620 and the temperature change data TCD from the temperature comparator 630, and may then generate the operation data GD based on the temperature data TD and the temperature change data TCD. In one embodiment, the operation data GD may include start time data for adjusting a start time of the screen saver mode, gain gradient data for adjusting a gain gradient of the screen saver mode, and minimum gain data for adjusting a minimum luminance of the screen saver mode. When the screen saver mode is operated, the operator 640 may output the operation data GD based on the temperature data TD and the temperature change data TCD to adjust the luminance gain of the display panel 100.

In an embodiment, the operator 640 may generate the operation data GD for optimizing the luminance gain of the display panel 100 based on the temperature data TD and the temperature change data TCD. For example, the operator 640 may generate start time data in which the start time of the screen saver mode becomes earlier as the temperature of the display panel 100 becomes higher. The operator 640 may generate the gain gradient data in which the gain gradient of the screen saver mode becomes steeper as the temperature of the display panel 100 becomes higher. The operator 640 may generate the minimum gain data in which the minimum luminance of the screen saver mode becomes lower as the temperature of the display panel 100 becomes higher.

In one embodiment, the operator 640 may receive the temperature data TD and may generate the operation data GD for optimizing the luminance gain of the display panel 100 according to a pre-stored look-up table when the temperature of the display panel 100 is high, e.g., above a predetermined or settable value. As shown in FIG. 5, when the temperature of the display panel 100 is high, the operator 640 may generate start time data having an early start time of the screen saver mode. In this case, since the screen saver mode start time point TSS becomes earlier, the first period P1 may become relatively shorter.

When the temperature of the display panel 100 is high, the operator 640 may generate gain gradient data having a steep gain gradient in the second period P2 after the screen saver mode is operated. In this case, the time at which the luminance gain of the display panel 100 reaches the minimum gain may become earlier, e.g., the minimum gain reaching time point TSM may become earlier.

When the temperature of the display panel 100 is high, the operator 640 may generate minimum gain data having a low minimum luminance. In this case, the minimum gain may be decreased in the third period P3 during which the minimum luminance is maintained. As described above, according to one or more embodiments of the display device 10, the screen saver controller adjusts the luminance gain of the screen saver mode by reflecting the temperature of the display panel 100, so that the screen saver mode may be optimized for temperature variations. Therefore, the lifespan of the pixels in the display panel 100 may be maximized through the screen saver mode.

Figure 6:
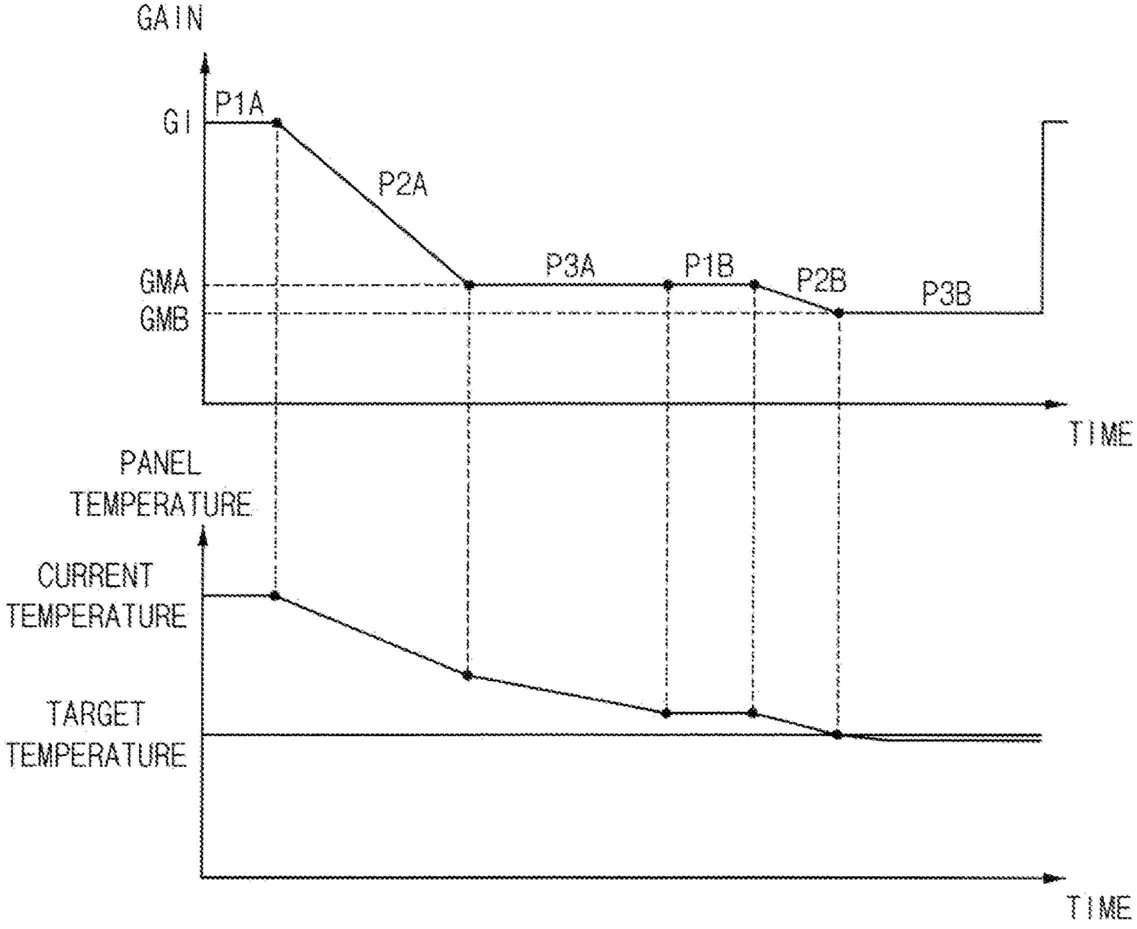
FIG. 6 illustrates an example of temperature variation of a display panel according to a luminance gain variation when a screen saver mode is operated.
Figure 7:
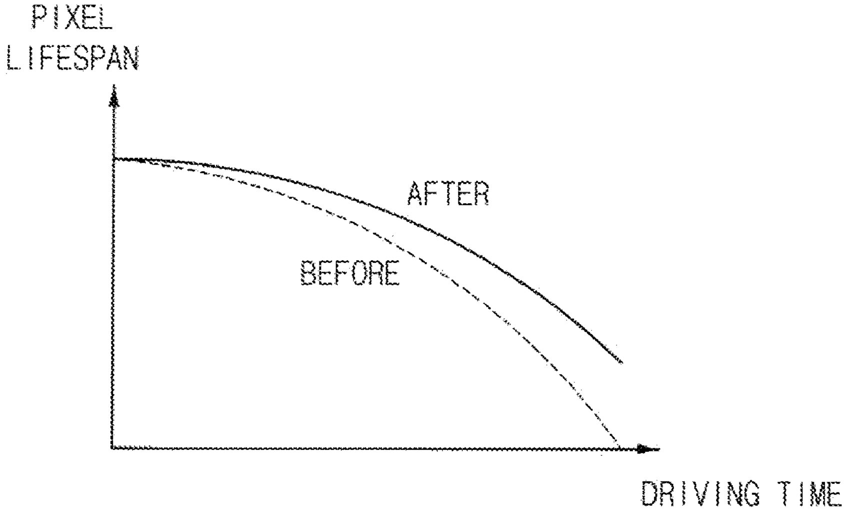
FIG. 7 illustrates an example of a pixel lifespan variation according to a driving time of a display device when a screen saver mode is operated.

FIG. 6 is a graph showing an example of temperature variation of a display panel according to a luminance gain variation when a screen saver mode is operated. FIG. 7 is a graph showing an example of pixel lifespan variation according to a driving time of a display device when a screen saver mode is operated.

Referring to FIGS. 1 to 7, according to an embodiment of the display device 10, the luminance gain of the screen saver mode is adjusted by reflecting the temperature of the display panel 100, so that the temperature of the display panel 100 matches the target temperature TTD.

In an embodiment, the screen saver controller may compare the temperature of the display panel 100 with the target temperature TTD in a period during which the temperature of the display panel 100 is maintained at a substantially constant level after the screen saver mode is operated. When the temperature of the display panel 100 is higher than the target temperature TTD in the period during which the temperature of the display panel 100 is maintained at the substantially constant level, the screen saver controller may adjust the luminance gain such that the temperature of the display panel 100 may be substantially equal to the target temperature TTD. For example, the temperature comparator 630 may compare the temperature of the display panel 100 with the target temperature TTD in the period during which the temperature of the display panel 100 is maintained at a substantially constant level after the screen saver mode is operated.

When the temperature of the display panel 100 is higher than the target temperature TTD, the temperature comparator 630 may generate an activation signal ES to transmit the generated activation signal ES to the operator 640. When the activation signal ES is received from the temperature comparator 630, the operator 640 may generate the operation data GD for allowing the temperature of the display panel 100 to be substantially equal to the target temperature TTD. When the temperature of the display panel 100 is lower than the target temperature TTD, the temperature comparator 630 may generate a deactivation signal ES to transmit the generated deactivation signal ES to the operator 640. When the deactivation signal ES is received from the temperature comparator 630, the operator 640 may maintain an existing operation of the screen saver mode.

As shown in FIG. 6, after the screen saver mode is operated, the luminance gain of the display panel 100 may be decreased as progressing through a first-A period P1A, a second-A period P2A, and a third-A period P3A. While a first minimum gain GMA is maintained, the temperature of the display panel 100 may be constantly maintained. The temperature comparator 630 may compare the temperature of the display panel 100 with the target temperature TTD in a first-B period P1B during which the temperature of the display panel 100 is maintained at a substantially constant level after the screen saver mode is operated. When the temperature of the display panel 100 is higher than the target temperature TTD, the temperature comparator 630 may generate the activation signal ES to transmit the generated activation signal ES to the operator 640. When the activation signal ES is received from the temperature comparator 630, the operator 640 may generate the operation data GD for allowing the temperature of the display panel 100 to be equal to the target temperature TTD. In a second-B period P2B, the luminance gain of the display panel 100 may be decreased to a second minimum gain GMB. In a third-B period P3B, when the luminance gain of the display panel 100 is maintained at the second minimum gain GMB, the temperature of the display panel 100 may be equal to the target temperature TTD.

As shown in FIG. 7, when the screen saver controller adjusts the luminance gain of the display panel 100 based on the temperature of the display panel 100, the lifespan of the pixels in the display panel 100 may be increased as compared with a case in which the temperature of the display panel 100 is not taken into consideration. For example, as the driving time of the display panel 100 becomes longer, the pixel lifespan difference may become greater. As described above, according to an embodiment of the display device 10, the screen saver controller may adjust the luminance gain of the screen saver mode by reflecting the temperature of the display panel 100, so that the screen saver mode may be optimized for the temperature variation. Therefore, the lifespan of the pixels in the display panel 100 may be increased or even maximized through the screen saver mode.

Figure 8:
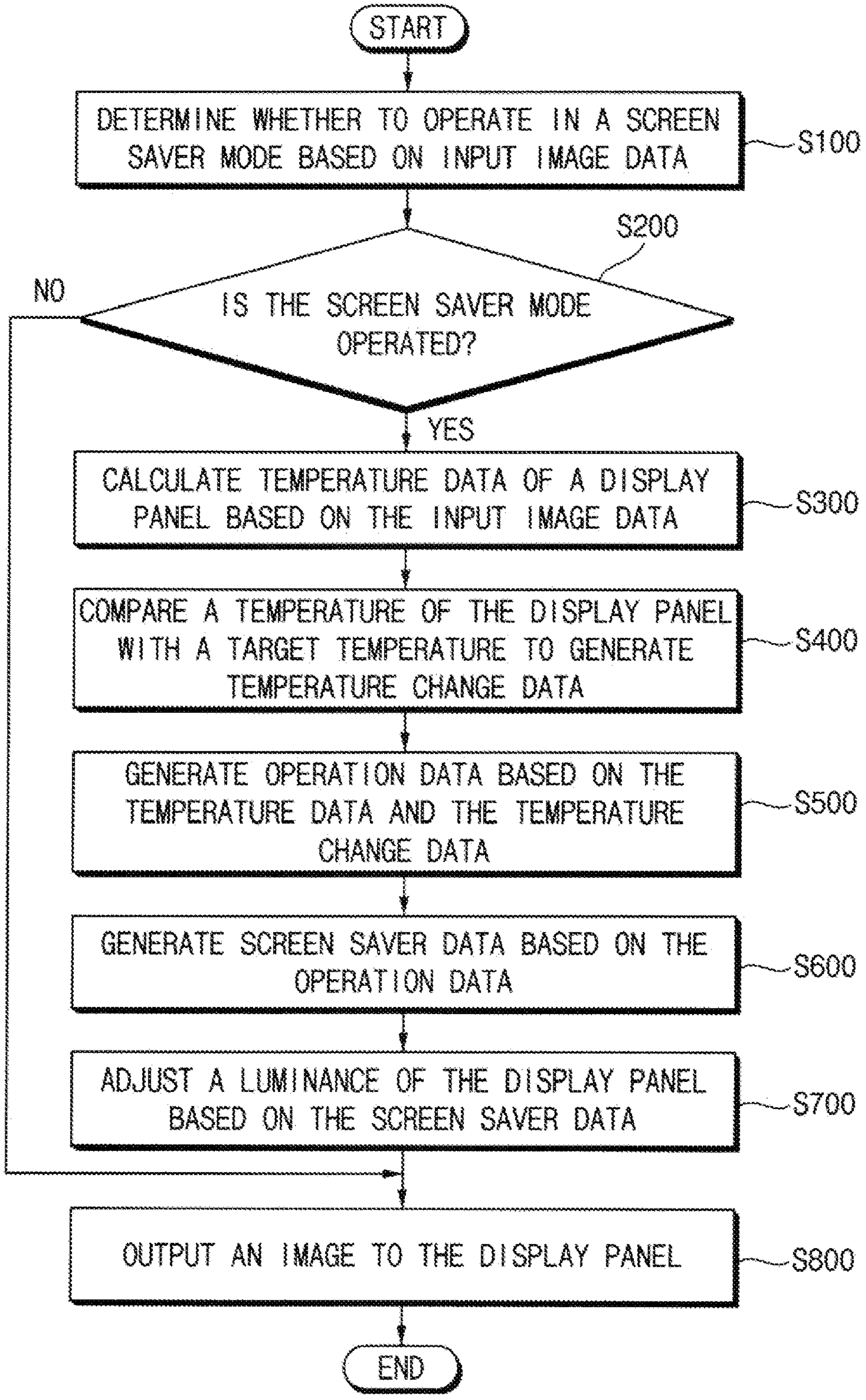
FIG. 8 illustrates an example of a screen saver mode in a display device.

FIG. 8 is a flowchart showing an embodiment of a method for controlling a screen saver mode when executed in a display device.

Referring to FIG. 8, according to this embodiment display device 10 may determine whether to operate in a screen saver mode based on input image data (S100) and may then activate or deactivate the screen saver mode (S200). The display device 10 may calculate temperature data TD of a display panel 100 based on the input image data when the screen saver mode is operated (S300), compare a temperature of the display panel 100 with a target temperature TTD to generate temperature change data TCD (S400), generate operation data GD based on the temperature data TD and the temperature change data TCD (S500), generate screen saver data (SSD) based on the operation data GD (S600), adjust a luminance of the display panel 100 based on the screen saver data SSD (S700), and output an image to the display panel 100 (S800).

In an embodiment, the display device 10 may determine whether to operate in the screen saver mode based on the input image data IMG (S100) and activate or deactivate the screen saver mode (S200). When the display device 10 deactivates the screen saver mode, the display device 10 may output the image to the display panel 100. When the display device 10 activates the screen saver mode, the display device 10 may adjust luminance gain by reflecting the temperature of the display panel 100.

In an embodiment, the display device 10 may calculate the temperature data TD of the display panel 100 based on the input image data when the screen saver mode is operated (S300). For example, a temperature calculator 620 may calculate the temperature data TD based on the input image data. In one embodiment, the temperature calculator 620 may calculate the temperature of the display panel 100 based on state information of the display panel 100 included in the input image data to output the temperature data TD. The temperature calculator 620 may transmit the temperature data TD to a temperature comparator 630. The temperature calculator 620 may transmit the temperature data TD to an operator 640. Meanwhile, the temperature calculator 620 may receive the state information from a sensor 610. The state information of the display panel 100 may include at least one of load information of the display panel 100, gray level information of the display panel 100, ambient temperature information of the display panel 100, luminance information of the display panel 100, or lifespan information of the display panel 100.

In an embodiment, the display device 10 may compare the temperature of the display panel 100 with the target temperature TTD to generate the temperature change data TCD (S400). For example, the temperature comparator 630 may receive the temperature data TD from the temperature calculator 620. The temperature comparator 630 may receive the target temperature TTD. In this case, the target temperature TTD may be settable or predetermined. The temperature comparator 630 may receive the temperature data TD and the target temperature TTD, and compare the temperature of the display panel 100 with the target temperature TTD to generate the temperature change data TCD. The temperature change data TCD may include information representing a difference between the temperature of the display panel 100 and the target temperature TTD. The temperature comparator 630 may transmit the temperature change data TCD to the operator 640.

In an embodiment, the display device 10 may generate the operation data GD based on the temperature data TD and the temperature change data TCD (S500). For example, the operator 640 may generate the operation data GD for optimizing the luminance gain of the display panel 100 based on the temperature data TD and the temperature change data TCD. In one embodiment, the operator 640 may generate a start time data in which a start time of the screen saver mode becomes earlier as the temperature of the display panel 100 becomes higher. The operator 640 may generate a gain gradient data in which a gain gradient of the screen saver mode becomes steeper as the temperature of the display panel 100 becomes higher. The operator 640 may generate a minimum gain data in which a minimum luminance of the screen saver mode becomes lower as the temperature of the display panel 100 becomes higher.

The operator 640 may receive the temperature data TD and may generate the operation data GD for optimizing the luminance gain of the display panel 100 according to a pre-stored look-up table when the temperature of the display panel 100 is high, e.g., above a predetermined value. When the temperature of the display panel 100 is high, the operator 640 may generate start time data having an early start time of the screen saver mode. In this case, since a screen saver mode start time point TSS becomes earlier, a first period P1 may become relatively shorter. When the temperature of the display panel 100 is high, the operator 640 may generate gain gradient data having a steep gain gradient in a second period after the screen saver mode is operated. In this case, a time at which the luminance gain of the display panel 100 reaches a minimum gain may become earlier. For example, a minimum gain reaching time point TSM may become earlier. When the temperature of the display panel 100 is high, the operator 640 may generate minimum gain data having a low minimum luminance. In this case, the minimum gain may be decreased in a third period during which the minimum luminance is maintained.

In an embodiment, the display device 10 may generate the screen saver data (SSD) based on the operation data GD (S600), adjust the luminance of the display panel 100 based on the screen saver data SSD (S700) and output the image to the display panel 100 (S800). As described above, according to one or more embodiments of the display device 10, the screen saver controller adjusts the luminance gain of the screen saver mode by reflecting the temperature of the display panel 100, so that the screen saver mode may be optimized for temperature variations. Therefore, the lifespan of the pixels in the display panel 100 may be increased or maximized through the screen saver mode.

Figure 9:
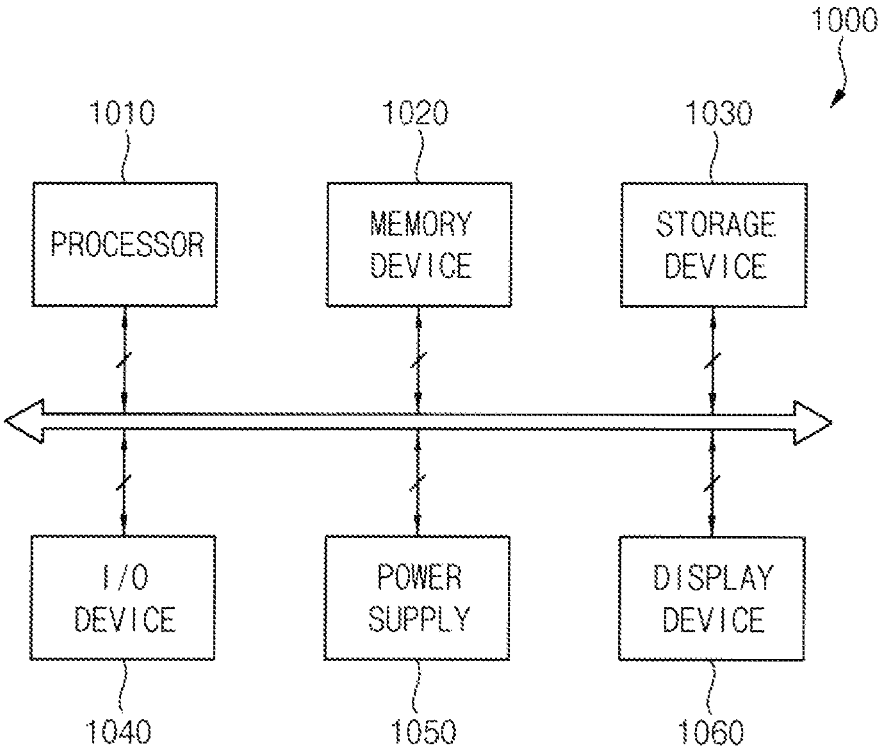
FIG. 9 illustrates an embodiment of an electronic device.
Figure 10:
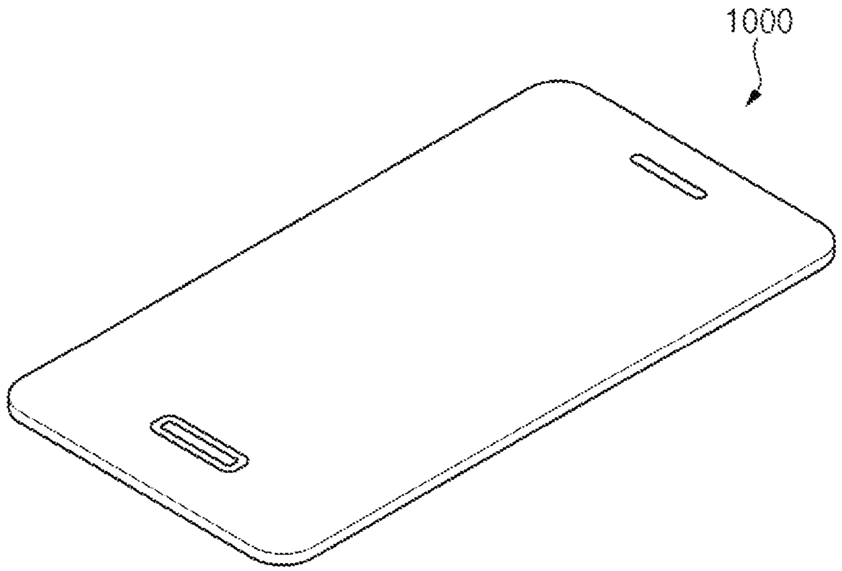
FIG. 10 illustrates an embodiment of a smart phone.

FIG. 9 is a block diagram showing an embodiment of an electronic device 1000, and FIG. 10 is a diagram showing an embodiment in which the electronic device of FIG. 9 is implemented as a smart phone.

Referring to FIGS. 9 and 10, the electronic device 1000 may include a processor 1010, a memory device 1020, a storage device 1030, an input/output (I/O) device 1040, a power supply 1050, and a display device 1060. The display device 1060 may be the display device 10 of FIG. 1 or another display device. In addition, the electronic device 1000 may include a plurality of ports for communicating with a video card, a sound card, a memory card, a universal serial bus (USB) device, other electronic devices, etc. In an embodiment, as shown in FIG. 10, the electronic device 1000 may be implemented as a smart phone. However, the electronic device 1000 is not limited thereto. For example, the electronic device 1000 may be implemented as another device, non-limiting examples of which include a cellular phone, a video phone, a smart pad, a smart watch, a tablet PC, a car navigation system, a computer monitor, a laptop, a head mounted display (HMD) device, etc.

The processor 1010 may perform various computing functions. The processor 1010 may be a micro processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, etc. The I/O device 1040 may include an input device such as a keyboard, a keypad, a mouse device, a touch pad, a touch screen, etc, and an output device such as a printer, a speaker, etc. In some embodiments, the I/O device 1040 may include the display device 1060. The power supply 1050 may provide power for operations of the electronic device 1000. The display device 1060 may be coupled to other components via the buses or other communication links.

The display device 1060 may display an image corresponding to visual information of the electronic device 1000. In this case, the display device 1060 may operate in a screen saver mode by reflecting a temperature of a display panel to increase or maximize the lifespan of a pixel. The display device 1060 may include: a display panel including a plurality of pixels; a data driver configured to provide a data signal to the display panel; a gate driver configured to provide a gate signal to the display panel; a timing controller configured to control the data driver and the gate driver; and a screen saver controller configured to determine whether to operate in a first mode based on input image data, and adjust a luminance of the display panel based on screen saver data when operating in the first mode.

In this case, the screen saver controller may include: a temperature calculator configured to calculate temperature data of the display panel based on the input image data; a temperature comparator configured to receive the temperature data and a target temperature, and compare a temperature of the display panel with the target temperature to generate temperature change data; an operator configured to receive the temperature data and the temperature change data, and generate operation data based on the temperature data and the temperature change data; and a screen saver data generator configured to receive the operation data, and generate screen saver data based on the operation data. Accordingly, according to the display device 1060, the screen saver controller adjusts a luminance gain of the screen saver mode by reflecting the temperature of the display panel, so that the screen saver mode optimized for the temperature variation may be provided, and the lifespan of the pixel may be increased. However, since the configuration has been described above, duplicated description related thereto will not be repeated.

The embodiments described herein may be applied to a display device and an electronic device including the display device. For example, the embodiments may be applied to various types of devices, including but not limited to a smart phone, a cellular phone, a video phone, a smart pad, a smart watch, a tablet PC, a car navigation system, a television, a computer monitor, a laptop, a digital camera, a head mounted display device, an MP3 player, etc.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, operators, calculators, comparators, units, multiplexers, generators, logic, interfaces, decoders, drivers, and other signal generating and signal processing features of the embodiments disclosed herein may be implemented, for example, in non-transitory logic that may include hardware, software, or both. When implemented at least partially in hardware, the controllers, processors, operators, calculators, comparators, devices, modules, units, multiplexers, generators, logic, interfaces, decoders, drivers, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, operators, calculators, comparators, modules, units, multiplexers, generators, logic, interfaces, decoders, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The foregoing is illustrative of embodiments and is not to be construed as limiting thereof. Although a few embodiments have been described, those skilled in the art will readily appreciate that many modifications are possible in the embodiments without materially departing from the novel teachings of the present disclosure. Accordingly, such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

a display panel including a plurality of pixels;

a display panel driver configured to drive the display panel; and a screen saver controller configured to generate temperature data corresponding to a temperature of the display panel, to compare the temperature of the display panel with a target temperature to generate temperature change data, to generate operation data based on the temperature data and the temperature change data, to generate screen saver data based on the operation data, and to adjust a luminance of the display panel based on the screen saver data when operating in a screen saver mode, wherein the operation data includes start time data to adjust a start time of the screen saver mode, gain gradient data to adjust a gain gradient of the screen saver mode, and gain data to adjust a luminance of the screen saver mode.

2. The display device of claim 1, wherein the target temperature is settable.

3. The display device of claim 1, wherein the screen saver controller includes:

a temperature calculator configured to generate the temperature data corresponding to the temperature of the display panel based on input image data;

a temperature comparator configured to generate the temperature change data by comparing the temperature of the display panel with the target temperature;

an operator configured to generate the operation data based on the temperature data and the temperature change data; and a screen saver data generator configured to generate the screen saver data based on the operation data.

4. The display device of claim 3, wherein the operator is configured to generate the start time data so that the start time of the screen saver mode is earlier as the temperature of the display panel increases, to generate the gain gradient data so that the gain gradient of the screen saver mode is steeper as the temperature of the display panel increases, and to generate the gain data in which the luminance of the screen saver mode decreases as the temperature of the display panel increases.

5. The display device of claim 4, wherein the temperature comparator is configured to compare the temperature of the display panel with the target temperature in a certain period, the certain period including a period during which the temperature of the display panel is maintained at a substantially constant level after the screen saver mode is operated, and to output an activation signal to the operator when the temperature of the display panel is higher than the target temperature.

6. The display device of claim 5, wherein the operator is configured to generate the operation data to allow the temperature of the display panel to be substantially equal to the target temperature when the activation signal is received from the temperature comparator.

7. The display device of claim 4, wherein the temperature comparator is configured to compare the temperature of the display panel with the target temperature in a certain period, the certain period including a period during which the temperature of the display panel is maintained at a substantially constant level after the screen saver mode is operated, and to output a deactivation signal to the operator when the temperature of the display panel is lower than the target temperature.

8. The display device of claim 3, wherein the screen saver controller further includes: a sensor configured to sense state information of the display panel based on the input image data, to generate sensing data based on the state information, and to output the generated sensing data to the temperature calculator.

9. The display device of claim 8, wherein the state information of the display panel includes at least one of load information of the display panel, gray level information of the display panel, ambient temperature information of the display panel, luminance information of the display panel, or lifespan information of the display panel.

* * * * *